Figure 1:
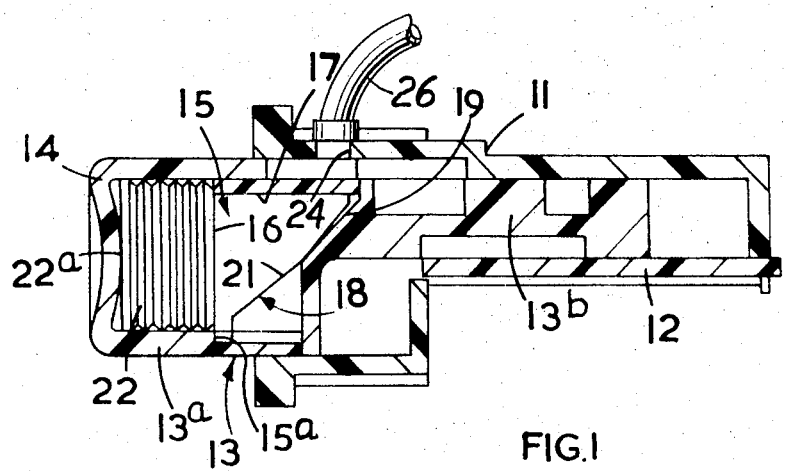

United States Patent [19]
Martin

[11] 3,780,248
[45] Dec. 18, 1973

[54] ELECTRICAL SWITCHES
[76] Inventor: Rex Martin, 263 Wensley Rd., Blackburn, Lancashire, England
[22] Filed: Feb. 23, 1972
[21] Appl. No.: 228,642

[30] Foreign Application Priority Data
Mar. 20, 1971  Great Britain..................... 7,541/71

[52] U.S. Cl............................ 200/167 A, 350/287
[51] Int. Cl. .............................................. H01h 9/16
[58] Field of Search.................. 200/167 R, 167 A; 40/28 R, 331; 350/112, 287, 286

[56] References Cited
UNITED STATES PATENTS
| 3,653,136 | 4/1972 | Ruppert............................. 350/287 |
| 3,636,915 | 1/1972 | Ruppert...................... 200/167 A X |
| 3,341,711 | 9/1967 | Shepard......................... 350/287 X |
| 3,163,739 | 12/1964 | Hutt................................ 200/167 A |
| 3,518,386 | 6/1970 | Guberman..................... 200/167 A |

Primary Examiner—Robert K. Schaefer
Assistant Examiner—William J. Smith
Attorney—John C. Holman et al.

[57] ABSTRACT

An electrical switch provided with a transparent, slidable, on-off operating member and a prism mounted in the operating member. The prism has a reflecting surface formed of two mutually inclined portions, each portion being disposed to reflect an image of one of a pair of legends indicating the operative condition of the switch so that either of the two images can be viewed at the end of the operating member depending upon the condition of the switch.

7 Claims, 3 Drawing Figures

PATENTED DEC 18 1973　　　　　　　　　　　　　3,780,248

ELECTRICAL SWITCHES

This invention relates to electrical switches.

The invention relates to an electrical switch comprising a casing, an operating member carried by the casing for movement relative thereto between a pair of spaced positions corresponding to a pair of operative states of the switch, a prism mounted for movement with the operating member, a pair of legends associated with the operating member and being indicative of the operative states of the switch, are means for illuminating the legends, said prism comprising a transparent body having first, second and third surfaces, the second surface being positioned adjacent the pair of legends, the first surface being disposed to be visible at one end of the operating member, and the third surface having mutually inclined portions arranged so that, in use, when the operating member is in one of the positions, an image of one of the legends is reflected from one of the mutually inclined portions towards a predetermined area of the first surface and when the operating member is in the other of its positions, an image of the other legend is reflected from the other mutually inclined portions towards said predetermined area of the first surface.

Preferably, the means for illuminating the legends is defined by an aperture in the casing of the switch through which light can pass. Conveniently, the light passing through the aperture, in use, is supplied by an optical cable positioned at one end adjacent the aperture and at its other end adjacent a bulb.

The term "legend" is used herein to mean any visible device which need not necessarily be a word and could for example be a symbol, or an area of colour.

Figure 2:
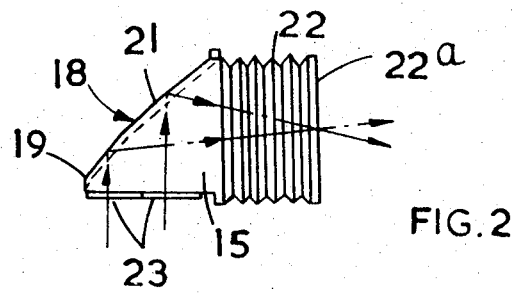
Figure 3:
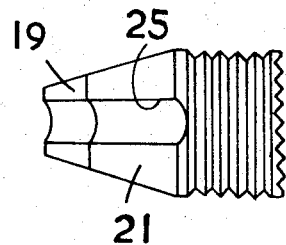

One example of the invention is illustrated in the accompanying drawings in which, FIG. 1 is a part sectional view of an electrical switch with a prism mounted in the switch, FIG. 2 is a side view of the prism shown in FIG. 1, and FIG. 3 is a plan view of FIG. 2.

Referring to the drawings, the switch includes a moulded synthetic resin casing 11, having a printed circuit board 12 closing an opening in the casing 11, the circuit board 12 being engaged as a snap fit with the casing. Slidably mounted within the casing 11 for movement relative to the casing and the circuit board 12 is an operating member 13 moulded from a transparent, synthetic resin material. One end 14 of the operating member 13 extends from the casing 11, and the other end of the operating member carries a movable contact (not shown) which is resiliently urged into engagement with the circuit board 12. Co-operating detent means (not shown) are provided on the operating member 13 and the casing 11 respectively to retain releasably the operating member in each of a pair of spaced positions, one of said positions defining an off position, and the other position defining an operative position in which the movable contact carried by the operating member bridges a pair of fixed contacts on the contact board 12.

The operating member 13 is formed in two parts 13a, 13b and housed within the operating member between the parts 13a, 13b is a transparent prism 15, the prism including an integral lug 15a which engages a fixed stop within the operating member to locate the prism 15 in position relative thereto. The prism 15 includes first and second surfaces 16,17 respectively inclined at right angles to one another and defining therebetween an inclined surface 18. The surface 18 defines first and second, mutually inclined portions 19,21 and the prism 15 is arranged within the operating member 13 so that the surface 18 is remote from the end 14 of the operating member. The surface 16 of the prism 15 is presented to the end 14 and is formed with an integral extension piece 22 which at its free end 22a abuts against the end 14 of the member 13. Secured to the surface 17 of the prism are a pair of colour filters 23 (FIG. 2) defining legends indicative of the two operating positions of the switch, the filters 23 in the particular example being red and green to indicate an on position and an off position respectively. The wall of the casing of the switch adjacent the surface 17 is formed with an aperture 24 and the filters 23 are arranged on the surface 17 so that one of the filters is exposed through the aperture 24 in each operating position of the switch. Mounted within the aperture 24 is one end of an optical cable 26, the other end of which is positioned so as to receive light from a bulb. Light passing through the aperture 24 shines through the adjacent filter 23 to produce a coloured beam dependent upon the colour of the filter, the beam being reflected by the surface 18 towards the free end 22a of the integral extension piece 22. Thus an image of the filter 23 which is immediately adjacent the aperture 24 is visible through the end 14 of the operating member 13. The dimensions of the filters 23 are such that when the operating memer 13 is moved to operate the switch the coloured image which is visible to an operator of the switch changes in accordance with the change in the operative condition of the switch.

The filters 23 are arranged so that, in use, light passing through a filter is reflected by a respective portion 19, 21 of the surface 18. Further, the mutual inclination of the portions 19,21 of the reflecting surface 18 is arranged so that, as shown in FIG. 2, rays of light reflected by the portions 19,21 respectively are directed towards the same region, preferably the central region, of the end surface 22a of the extension piece 22. Thus, with the arrangement so far described, the coloured images of the filters 23 respectively would be visible through the same region of the end 14 of the operating member. Without the provision of the mutually inclined surfaces 19,21, however, rays of light from the filters 23 would be reflected by the surface 18 towards different regions of the surface 22a of the extension piece so as to produce one image visible at an upper part of the end 14 and another image visible at a lower part of the end 14.

The surface 18 is also provided with a centrally disposed groove 25 (FIG. 3) extending transversely across the portions 19, 21. The groove 25 is of part-circular cross-section and so the base of the groove 25 defines within the prism 15 a convex, reflective surface. This convex surface acts to spread part of the light reflected by the portion 19,21, in use, so that the image of each filter 23 is produced over the whole area of the surface 22a of the extension piece 22. Further the surface 22a and the walls of the extension piece 22 defining the surface 22a are serrated, the serrations on the surface 22a diffusing the light directed onto the surface 22a and the serrations on the walls of the extension piece serving to prevent escape of light reflected by the surface 18 before reaching the surface 22a.

I claim:

1. An electrical switch comprising a casing, an operating member carried by the casing for movement relative thereto between a pair of spaced positions corresponding to a pair of operative states of the switch, a prism mounted for movement with the operating member, a pair of legends associated with the operating member and being indicative of the operative states of the switch, and means for illuminating the legends, said prism comprising a transparent body having first, second and third surfaces, the second surface being positioned adjacent the pair of legends, the first surface being disposed to be visible at one end of the operating member, and the third surface having mutually inclined portions arranged so that, in use, when the operating member is in one of its positions, an image of one of the legends is reflected from one of the mutually inclined portions towards a predetermined area of the first surface and when the operating member is in the other of its positions, an image of the other legend is reflected from the other mutually inclined portion towards said predetermined area of the first surface.

2. An electrical switch as claimed in claim 1, wherein the means for illuminating the legends is defined by an aperture in the casing through which light can pass.

3. An electrical switch as claimed in claim 2, wherein the casing is adapted to receive one end of an optical cable adjacent the aperture.

4. An electrical switch as claimed in claim 1, wherein the third surface of the prism is formed with a centrally disposed groove so as to extend transversely across the first and second portions thereof, the base of the groove defining within the prism a convex, reflective surface arranged so that, in use, light reflected by the third surface in each of the first and second positions of the operating member issues from said first surface over the whole area of the surface.

5. An electrical switch as claimed in claim 1, wherein the first surface is serrated so as to diffuse the light directed towards the first surface in use.

6. An electrical switch as claimed in claim 5, wherein the outer surface of the prism adjacent the first surface is also serrated.

7. An electrical switch as claimed in claim 1, wherein the legends are mounted on said second surface of the prism.

* * * * *